United States Patent [19]
Luke

[11] Patent Number: 5,934,736
[45] Date of Patent: Aug. 10, 1999

[54] COVER FOR A PICKUP TRUCK BED FOR USE WITH A FIFTH-WHEEL HITCH

[76] Inventor: Alvin D. Luke, 1100 Burnett Dr. #233, Nampa, Id. 83651

[21] Appl. No.: 08/964,058

[22] Filed: Nov. 4, 1997

[51] Int. Cl.[6] .................................................. B60P 7/02
[52] U.S. Cl. ............................... 296/100.04; 296/100.01; 280/507
[58] Field of Search ................ 296/100.01, 100.02, 296/100.04, 100.17; 280/423.1, 507, 433

[56] References Cited

U.S. PATENT DOCUMENTS

| | | | |
|---|---|---|---|
| 4,216,990 | 8/1980 | Musgrove et al. | 296/100.02 X |
| 4,669,748 | 6/1987 | LeVee | 280/423.1 |
| 4,685,695 | 8/1987 | LeVee | 280/423.1 |
| 4,832,359 | 5/1989 | Rafi-Zadeh | 280/423.1 |
| 5,056,856 | 10/1991 | Pederson | 296/100 |
| 5,303,947 | 4/1994 | Gerber | 280/423.1 |

*Primary Examiner*—D. Glenn Dayoan
*Assistant Examiner*—Chad D. Wells
*Attorney, Agent, or Firm*—David S. Thompson

[57] ABSTRACT

A covering apparatus is usable with a pickup truck having a bed that is fitted with a fifth-wheel hitch, and protects interior cargo space from the elements and theft, and also tends to reduce the aerodynamic drag of the truck. The covering apparatus provides a cover defining a hitch opening allowing access to the fifth wheel hitch. A trough defines a channel between the hitch opening and the tailgate, which is notched to fit the trough. A boot forms a weather-tight seal with a trailer gooseneck attached to the fifth-wheel hitch. Side rail supports allow the width of the covering apparatus to be adjusted according to the width of the truck bed. A removable trough floor allows the hitching and unhitching where the trailer gooseneck would otherwise make contact with the floor of the trough.

4 Claims, 5 Drawing Sheets

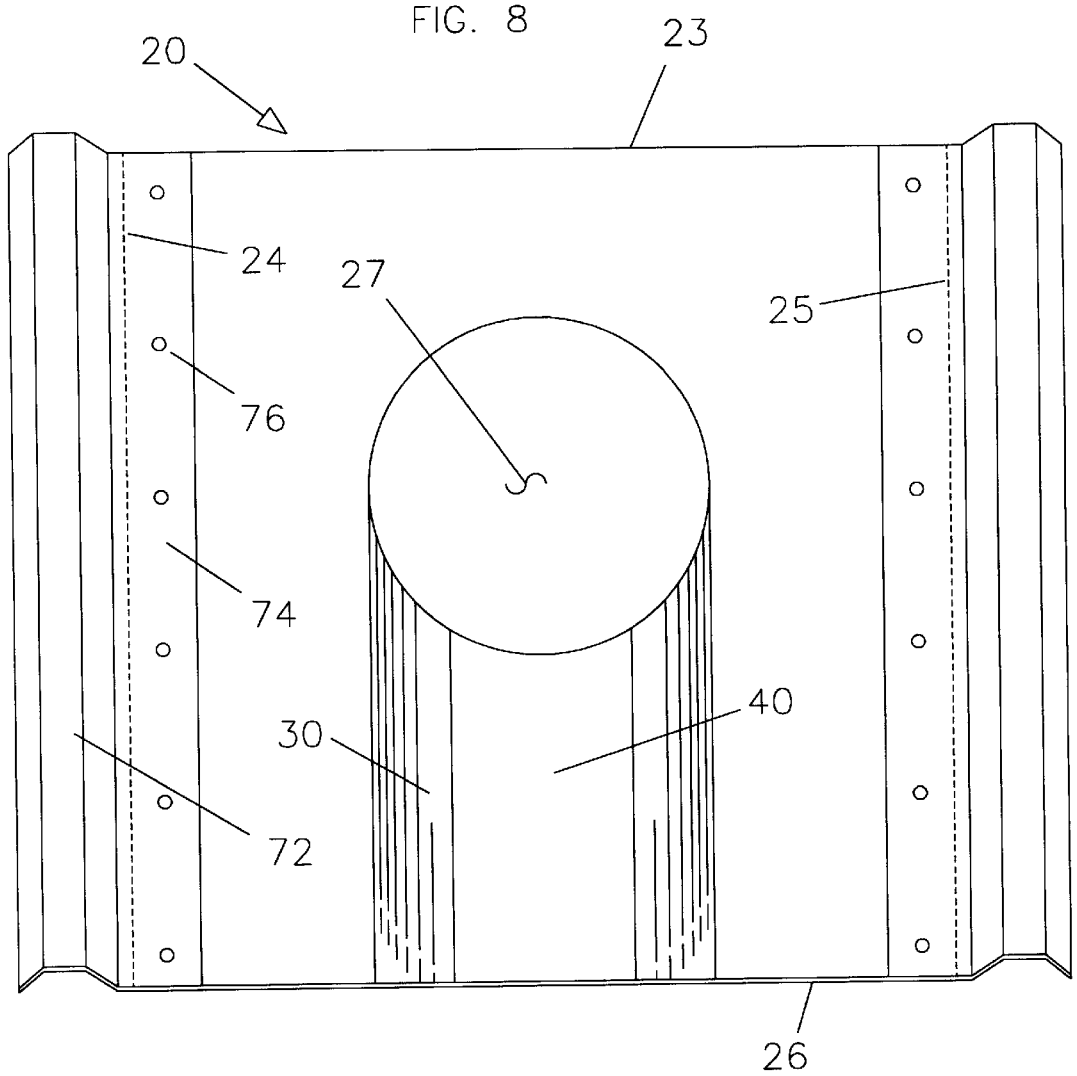
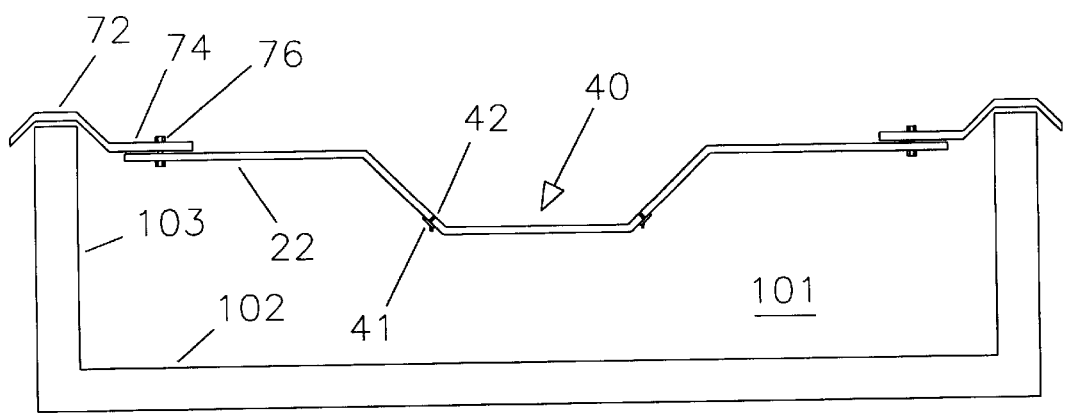

COVER FOR A PICKUP TRUCK BED FOR USE WITH A FIFTH-WHEEL HITCH

CROSS-REFERENCES

There are no applications related to this application filed in this or any foreign country.

BACKGROUND

A covering apparatus for the bed of a pickup truck, adapted for use with a fifth-wheel type trailer hitch, is known. Such a covering apparatus protects the storage area within the pickup truck's box from theft and the weather. It also creates an improved appearance and reduces air friction, thereby decreasing gasoline consumption.

It is also known to adapt the cover for easy hitching and unhitching by providing a trough between the tailgate and the hole defined in the cover above the fifth-wheel hitch mounted on the truck's bed. During the hitching process, the gooseneck of the trailer travels within the trough. Various trailers have goosenecks having various depths and angles; the difference is particularly noticeable between RV type fifth-wheel trailers and stock type fifth-wheel trailers. Where the trough is too shallow for the gooseneck, the cover is not usable. Where the trough is too deep, valuable space is lost within the truck's box. Known covers have not yet developed structures that will accoodate a gooseneck requiring a deep trough while still preserving space within the truck's box.

A related problem is that due to the need to have deeper and shallower troughs built into the covers, depending on the type of gooseneck, there is a need for tailgates having deeper and shallower notches that correspond to the troughs in the cover. This increases the cost of production.

Another problem seen with covers used with pickups towing fifth-wheel trailers is that the required width of the cover is not consistent between the various pickup truck manufacturers. As a result, the cost of production and inventory is increased.

For the foregoing reasons, there is a need for a cover for a pickup truck bed for use with a fifth-wheel hitch that can accommodate trailer goosenecks that require both deep and shallow troughs, and trucks having wide and narrow boxes having different varying lengths, without loss of storage space or a variety of differently sized covers and tailgates.

SUMMARY

The present invention is directed to an apparatus that satisfies the above needs. A novel covering apparatus is provided that adjusts to fit pickup truck boxes having a variety of widths and lengths and that in one embodiment provides a removable trough floor that allows use of the same tailgate with both stock fifth-wheel trailers and RV fifth-wheel trailers.

The covering apparatus of the present invention provides some or all of the following structures.
(A) A cover is sized to extend over the pickup's bed, and defines a hitch opening sized to allow passage of a gooseneck trailer hitch. The length of the cover is typically equal to the length of the pickup's box, but may be shortened where a forward portion of the pickup's bed is used to support a cross-box. The width of the cover is sized to fit a narrow pickup bed; the rail supports adapt the cover where the pickup has a wider bed. The cover typically provides:
  (a) A trough, formed by the upper surface of the cover, defines a channel extending from the hitch opening to the tailgate.
  (b) Left and right front support cover brackets, carried by the cover, are adapted to mate with left and right front support truck brackets, carried by the truck.
  (c) Left and right rear support cover brackets, carried by the cover, are adapted to mate with left and right rear support truck brackets, carried by the truck.;
(B) Left and right rail supports extend the length of the upper left and right sidewalls of the pickup's box and allow adjustment of the combined width of the cover and rail supports to fit any pickup truck. Each rail support typically provides:
  (a) An elongate rail cap is adapted to fit over and be supported by the sidewalls of the pickup trucks box and by the brackets that mate the cover to the pickup box.
  (b) A flange, extending from the rail cap toward the middle of the truck box, defines fastening holes for attachment to the cover. By advantageously locating corresponding attachment holes on the cover, the combined width of the cover and rail supports may be adjusted to fit any pickup truck.
(C) A flexible boot, carried by the cover adjacent to the hitch opening is adapted for attachment to the gooseneck trailer hitch. The base of the boot is typically attached to the upper surface of the cover by snaps. The boot may be zippered to allow a tight connection to the trailer gooseneck.
(D) A tailgate has an upper edge defining a notch sized to mate with the trough of the cover. As a result, the gooseneck trailer hitch can pass through the notch, then through the channel defined by the trough, and then be lowered into the hitch opening defined in the upper surface of the cover.

A more detailed description of one version of the trough formed by the upper surface covering apparatus includes the following:
(A) Left and right sloping sidewalls of the trough are typically oriented at approximately 45 degrees, creating a stronger cover surface than right-angled sidewalls.
(B) A removable trough floor is removed in circumstances where the trailer gooseneck extends too low, and would otherwise not pass through the trough. This is particularly the case with stock trailers.
(C) Fasteners, carried by the sloping sidewalls and the removable trough floor, allow the removable trough floor to be fastened to the left and right sloping sidewalls for travel, and removed for hitching and unhitching.

It is therefore a primary advantage of the present invention to provide a novel cover for a pickup truck bed for use with a fifth-wheel hitch that is sizable to pickup trucks of various widths.

A further advantage of the present invention is to provide a novel cover for a pickup truck bed for use with a fifth-wheel hitch that is provided with a trough defining a channel between the tailgate and a hitch opening defined in the cover. Optionally, a removable trough floor allows attachment of a trailer that would otherwise require a deeper trough. As a result of the removable trough floor, a single tailgate design, having a notch adapted for a more shallow trough, may be used with with covers having either integral or removable trough floors.

DRAWINGS

These and other features, aspects, and advantages of the present invention will become better understood with regard to the following description, appended claims, and accompanying drawings where:

3

FIG. 8 is a top view of a second version of the covering apparatus of the invention, showing a hitch opening adapted for use with a fifth-wheel horse type trailer; and FIG. 9 is an end view of the covering apparatus of FIG. 8, showing the removable trough floor.

DESCRIPTION

Figure 1:
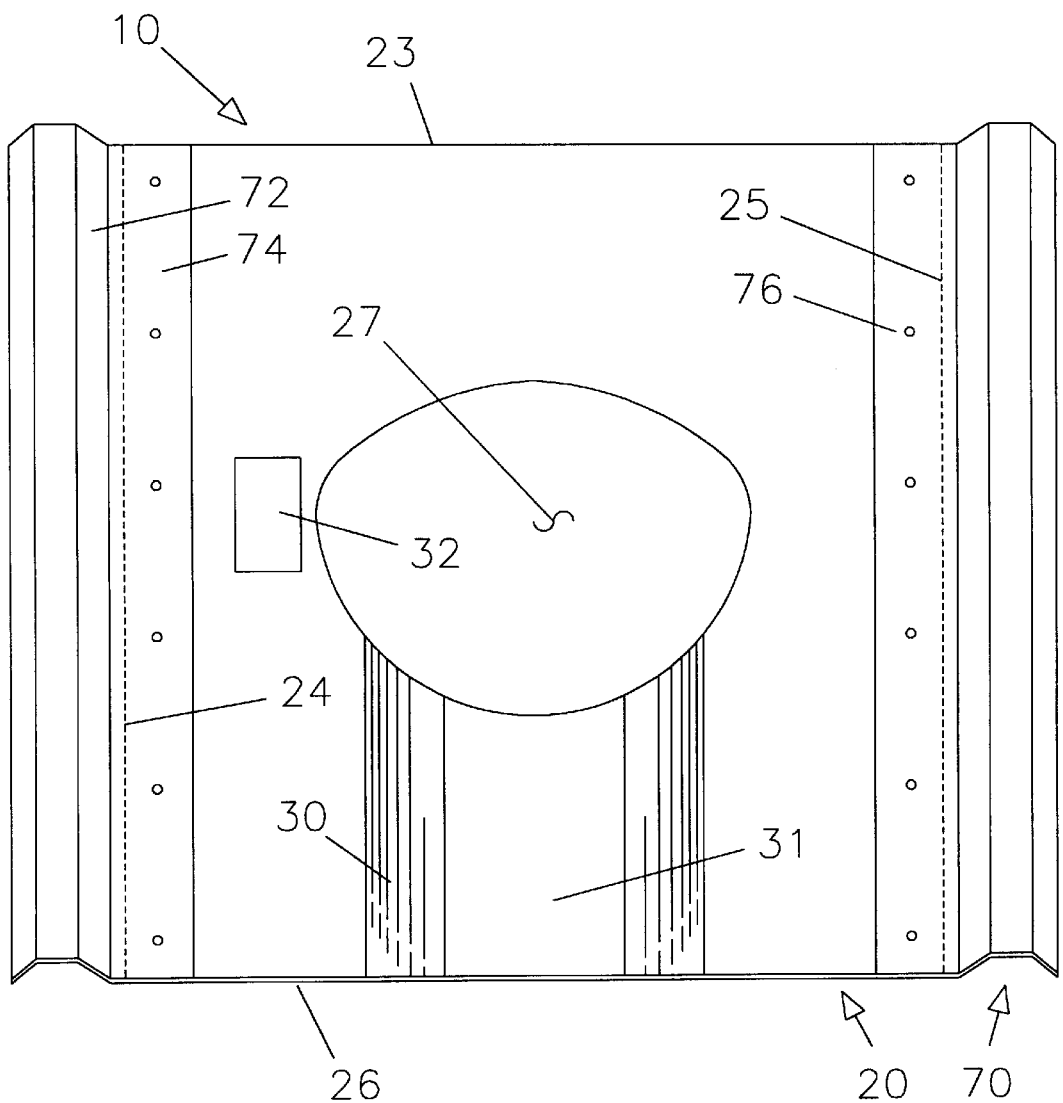
FIG. 1 is a top view of a version of the covering apparatus of the invention, showing a hitch opening adapted for use with a fifth-wheel RV type trailer.

Referring in generally to the figures, a covering apparatus 10 constructed in accordance with the principles of the invention is seen. The covering apparatus is usable with a pickup truck having a bed that is fitted with a fifth-wheel hitch, and protects interior cargo space from the elements and theft, and also tends to reduce the aerodynamic drag of the truck. The covering apparatus 10 provides a cover 20 and a tailgate 90. The cover 20 provides a hitch opening 27 to allow access to the fifth wheel hitch. A trough 28 defines a channel 29 between the hitch opening and the tailgate having a notch 93 sized to fit the trough. A boot 80 forms a weather-tight seal with a trailer gooseneck 200 attached to the fifth-wheel hitch. Side rail supports 70 allow the width of the covering apparatus 10 to be adjusted according to the width of the truck bed 102.

Figure 2:
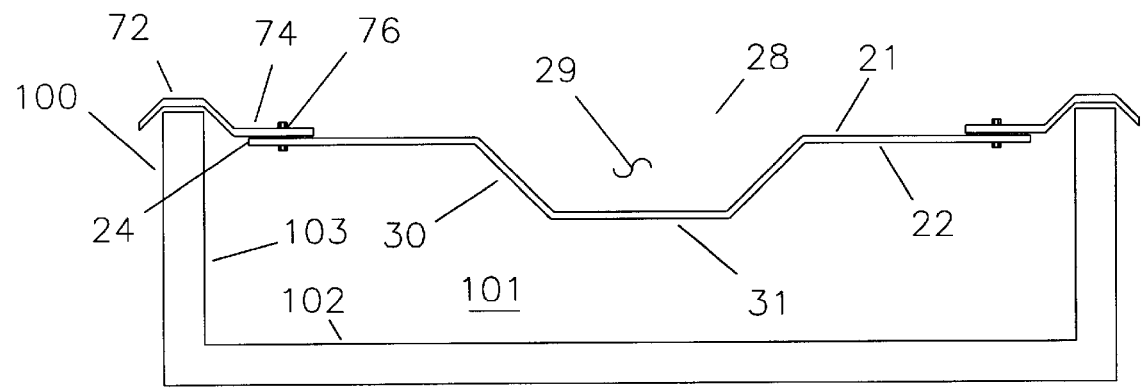
FIG. 2 is an end view of the covering apparatus of FIG. 1.

Referring to FIGS. 1 and 2, a cover 20 is seen defining a hitch opening 27 sized for use with most RV type fifth-wheel trailers. In a preferred embodiment, the hitch opening is approximately 44 inches side-to-side and 34 inches front-to-back, having rounded corners, as seen in FIG. 1. The cover is typically made of fiberglass or plastic, having an upper surface 21 that is suitable for exposure to weather, and a lower surface 22 that may be left unfinished, if desired, to save costs.

The length of the cover, from a forward edge 23 to a rear edge 26, is typically 59.25 inches in a preferred embodiment where the cover is adapted for use with a full-size pickup truck with an extended cab and a short bed, having a front mounted cross-box carried forward of the cover, immediately behind the cab. The width of the cover, between the left edge 24 and right edge 25, is typically 60 inches. Other lengths and widths could easily be manufactured, depending on the type of truck to be fit, and also depending on whether the cover is to cover the entire box, or only the portion of the box rearward of a cross-box or similar type of tool box.

A distinctive feature of the cover is a trough 28 having sloping sidewalls 30 and an integral trough floor 31. In the version of the invention of FIGS. 1 and 2, the cover is made of one piece; i.e., the sidewalls and trough floor are integral with the rest of the cover. The sloping sidewalls are typically oriented at 45 degrees with respect to the horizontal trough floor. The trough defines a channel 29 that extends from the hitch opening 27 to the tailgate 90. As a result, a trailer gooseneck 200 may be passed through the channel 29 during the hitching and unhitching operations.

An access cover 32 provides a hinged door, typically having a locking mechanism, that allows access to the fifth-wheel hitch mechanism. By using the cover 32 to gain access to the fifth-wheel hitch, the hitch can be locked or released while the cover 20 is in place.

A second version of the invention, seen in FIGS. 8 and 9, provides a removable trough floor 40. This version of the invention is adapted for use with stock trailer type fifth wheel trailers. The removable trough floor 40 is removed during the hitching or unhitching operations, allowing for a trailer gooseneck that protrudes deeper into the box of the pickup 100, i.e. closer to the bed 102. When the removable trough floor 40 is installed, the cover 20 seen in FIGS. 8 and 9 is usable with the tailgate 90. As a result, the covers seen in FIGS. 1, 2, 8 and 9 are both usable with the same tailgate. This results in a substantial savings for manufacturers and retailers, by eliminating the need to produce and inventory as many tailgates.

The removable trough floor 40 is supported by cinch hasps 41, or any suitable fastener, from the lower surface 22 of the sloping sidewalls 30 of the cover. Typically, some type of gasket seal 42 is used to produce a water-tight seal between the sloping sidewalls 30 and the removable trough floor 40.

Referring to FIGS. 1, 2, 8, and 9, side rail supports 70 can be seen. Left and right rail supports 70 support the cover 20 from the sidewalls 103 of the box 101 of the truck. The rail supports are as long as the cover 20, and are typically made of aluminum diamond plate or other suitable material.

Mirror image left and right rail supports 70 include a rail cap 72 having a flange 74. The rail cap 72 is is formed, as seen in FIGS. 2 and 9, to be supported by the rim on the top of a sidewall 103. A sponge rubber or similar coating (not shown) is carried under each rail cap 72, to protect the finish on the upper rim of the sidewalls 103 of the truck.

The planar flange 74 extends approximately 6 inches from the pickup's sidewalls toward the center of the box 101, and is oriented horizontally. As is best seen in FIGS. 2 and 9, the flange overlaps with the edges of the cover 20. The amount of overlap may be adjusted, as required, depending on the width of the truck's box. The wider the truck the less overlap; the narrower the truck the more overlap. Once the correct overlap has been selected, fastening holes 76 are drilled through both the flange and the surface of the cover adjacent to the left and right edges 24, 25, and bolts or other suitable fasteners are used to secure the rail supports 70 to the cover 20.

Figure 4:
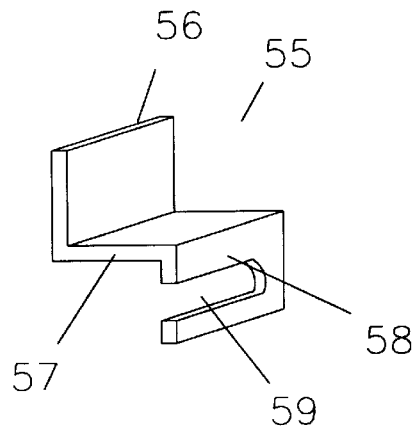
FIG. 4 is a perspective view of the front support truck bracket, carried by the left forward sidewall of the box of a pickup truck.

Referring to FIG. 4, a front support truck bracket 55 adapted for installation on a front portion of the left sidewall of the truck is seen. A mirror image bracket (not shown) is adapted for installation on a front portion of the right sidewall of the truck. The front support truck brackets 55 support the front (i.e. closest to the cab) portion of the cover 20 by engaging the front support cover brackets 50 in a manner that allows some pivoting during the installation process.

A vertical plate 56 of the front support truck bracket 55 is attached to an upper and forward portion of the sidewall by welding, bolting or other fastening methods. A horizontal extension 57 extends from the truck sidewall toward the middle of the truck bed. A vertical flange 58 extends downwardly from the horizontal extension 57 and defines a slot 59 that is sized to receive the horizontal bolt 53 of the front support cover bracket 50.

Figure 5:
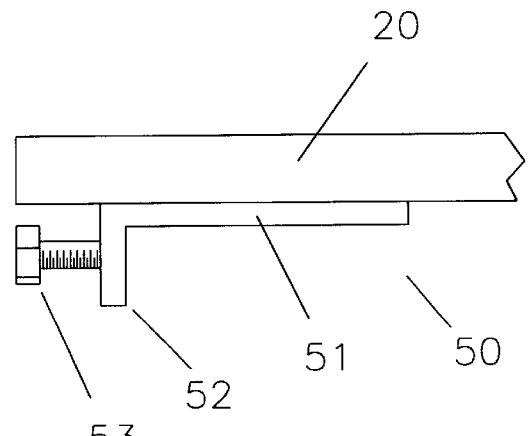
FIG. 5 is a cross-sectional view of the front support cover bracket, carried by a left forward portion of the covering apparatus, and engageable with the bracket of FIG. 4.

Referring to FIG. 5, a front support cover bracket 50 adapted for installation on a forward portion of the left side of the lower surface 22 of the cover is seen. A mirror image bracket (not shown) is adapted for installation on a front portion of the right side of the cover. The front support brackets 50 support the front (i.e. closest to the cab) portion of the cover 20 by engaging the front support truck brackets 55 in a manner that allows some pivoting during the installation process.

A horizontal plate 51 is secured to the lower surface 22 of the cover. Typically, this is done by molding the plate 51 into the cover during the fiberglass assembly process. However, any suitable fastening method could alternatively be employed. A vertical flange 52 extends from the plate 51 downwardly, toward the truck bed. A horizontally extending bolt 53 is sized to engage the slot 59 of the bracket 55, thereby holding down the forward portion of the cover 20.

Figure 6:
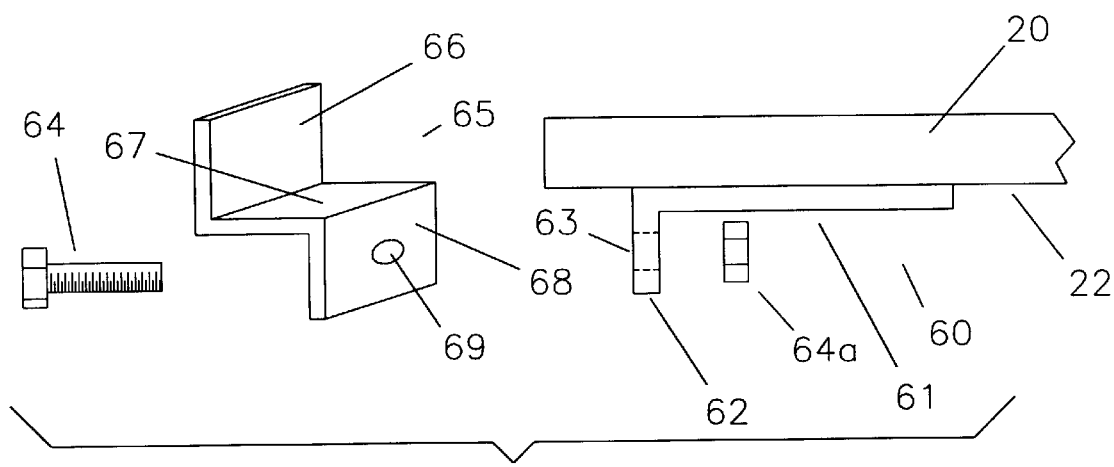
FIG. 6 is an exploded view of the left rear support truck bracket and the left rear support cover bracket to which it is attached by means of a bolt and nut.

Referring to FIG. 6, an exploded view of the rear support cover bracket 60 and rear support truck bracket 65 is seen. The two brackets 60, 65 are fastened together by a bolt 64, thereby holding down the rear portion of the cover 20. The brackets 60, 65 shown are adapted for installation on the left side of the cover and truck; mirror image brackets would be adapted for use on the right side of the cover and truck.

A vertical plate 66 of the rear support truck bracket 65 attaches to an upper and rearward portion of the sidewall by welding, bolting or other fastening methods. A horizontal extension 67 extends from the truck sidewall toward the middle of the truck bed. A vertical flange 68 extends downwardly from the horizontal extension 67 and defines a hole 69 sized to receive the bolt 64.

Continuing to refer to FIG. 6, the rear support cover bracket 60 provides a horizontal plate 61 secured to the lower surface 22 of the cover. Typically, this is done by molding the plate 61 into the cover during the fiberglass assembly process. However, any suitable alternate fastening method could alternatively be employed. A vertical flange 62 defines a hole 63, and extends from the plate 61 downwardly, toward the truck bed. The hole 63 is sized to receive the bolt 64.

Figure 3:
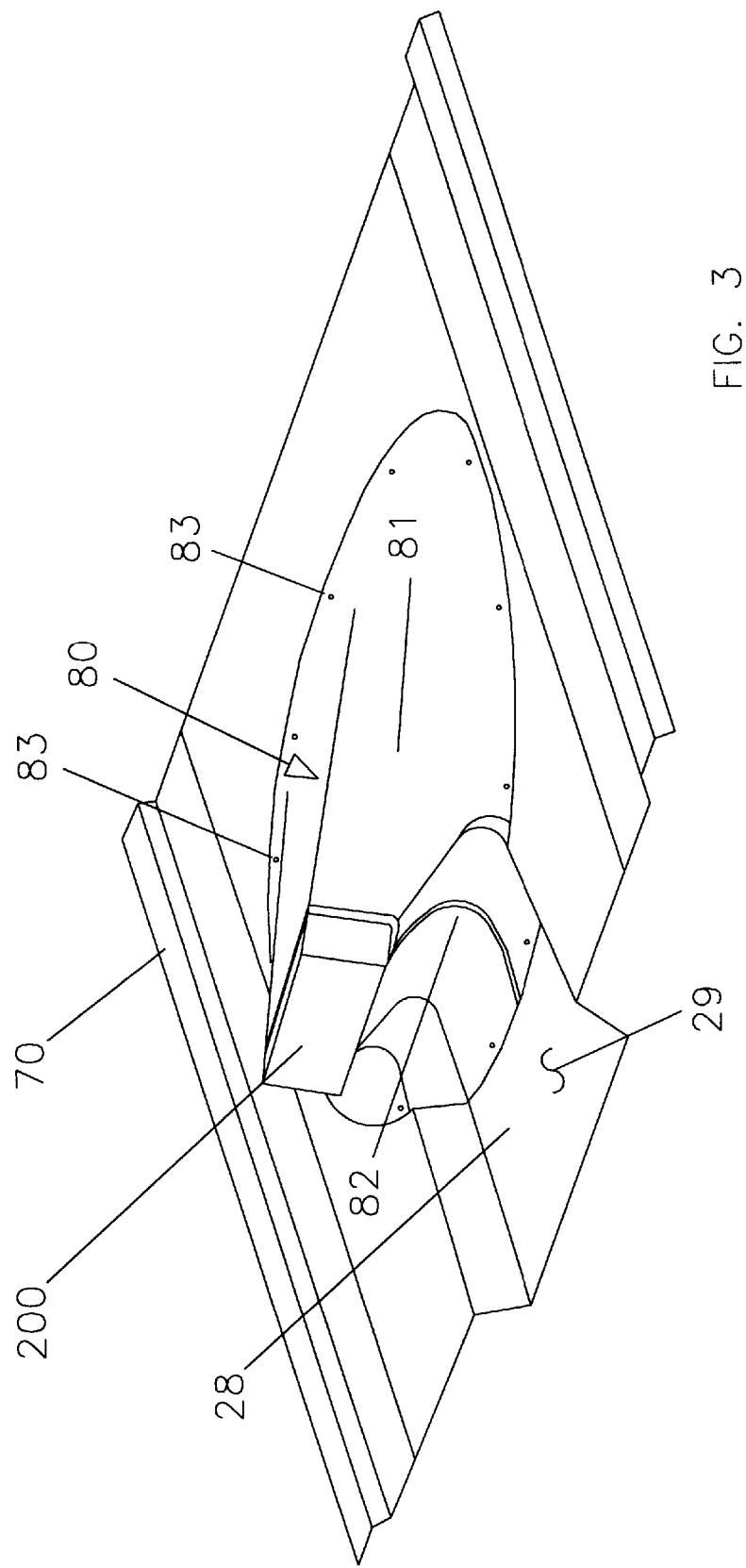
FIG. 3 is a perspective view of the boot covering the hitch opening of the covering apparatus of FIG. 1.

Referring to FIG. 3, a version of the boot 80 adapted for attachment to the cover of FIG. 1 is seen. The boot provides a weather-tight covering over the hitch opening 27, for use when the trailer gooseneck 200 is installed on the fifth-wheel hitch.

The boot 80 provides a fabric body 81 that is secured to the upper surface 21 of the cover 20 by snaps 83 or other fasteners. A zipper 82 allows the boot to be secured tightly about the gooseneck after the gooseneck is attached to the fifth-wheel hitch.

Figure 7:
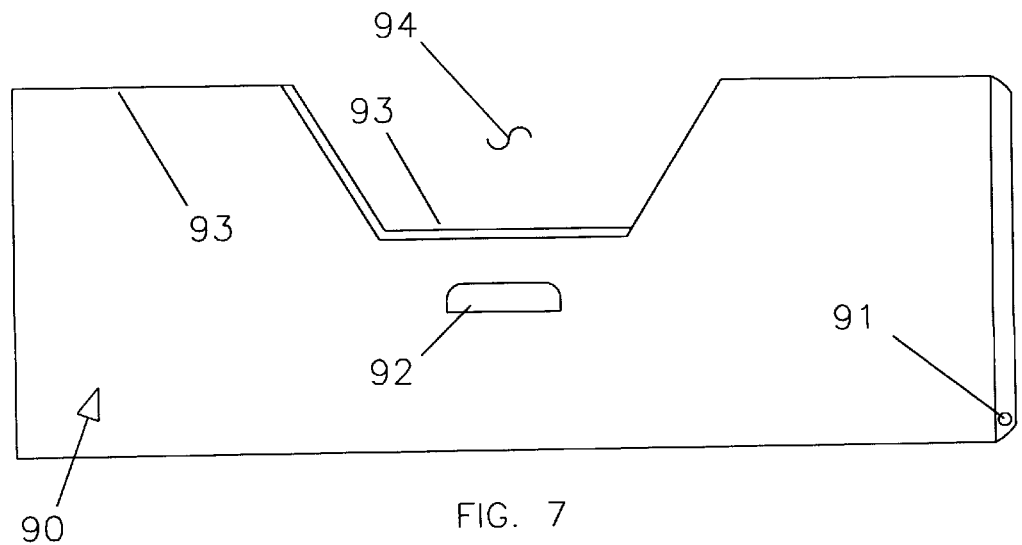
FIG. 7 is a rear view of the notched tailgate.

Referring to FIG. 7, a tailgate 90 adapted for use with the cover seen in FIGS. 1 and 2 or the cover seen in FIGS. 8 and 9. The tailgate 90 provides a hinge 91 that allows installation to any compatibly sized pickup truck. A handle 92 allows the tailgate 90 to be opened and closed in the usual manner. The upper edge 93 of the tailgate defines a notch 94 that is sized to adapt to the sloping sidewalls 30 and the integral trough floor 31 or removable trough floor 40 of the trough 28. This is most clearly seen by a comparison of FIG. 7 to FIGS. 2 and 9.

To use the covering apparatus 10 of the invention, the user first installs the cover on the pickup truck. The cover is maneuvered until the horizontal bolts 53 of the left and right front support cover brackets 50 engage the slots 59 of the front support truck brackets 55. The front portion of the cover is typically held approximately flush with the rim of the sidewalls 103 of the truck box 101, while the rear of the cover is typically held several inches above the sidewalls 103.

Once the bolts 53 engage the slots 59, the rear portion of the cover is then lowered, bringing the hole 69 of the rear support truck bracket 65, adjacent to the hole 63 in the rear support cover bracket 60. The bolt 64 and nut 64a are then used to secure the brackets 60, 65 together.

Where the cover 20 provides a removable trough floor, as seen in FIG. 9, the cinch hasps 41 may be released, and the floor 40 removed. Where the floor 40 is removed, the tailgate is also lowered. The gooseneck 200 is then passed through the trough 28, and attached to the fifth-wheel hitch. The removable trough 40 (if present) is then replaced, and the tailgate is raised.

The boot 80 is then installed. The snap fasteners 83 are first installed, and the fabric body 81 of the boot is arranged about the gooseneck 200. The zipper 82 is then fastened, thereby forming a weather-tight seal over the hitch opening 27.

The previously described versions of the present invention have many advantages, including a primary advantage of providing a novel cover for a pickup truck bed for use with a fifth-wheel hitch that is sizable to pickup trucks of various widths and lengths.

A further advantage of the present invention is to provide a novel cover for a pickup truck bed for use with a fifth-wheel hitch that is provided with a trough defining a channel between the tailgate and a hitch opening defined in the cover. Optionally, a removable trough floor allows attachment of a trailer that would otherwise require a deeper trough. As a result of the removable trough floor, a single tailgate design, having a notch adapted for a more shallow trough, may be used with with covers having either integral or removable trough floors.

The invention resides not in any one of these features per se, but rather in the particular combination of all of them herein disclosed and claimed and it is distinguished from the prior art in this particular combination of all of its structures for the functions specified.

Although the present invention has been described in considerable detail and with reference to certain preferred versions, other versions are possible. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A covering apparatus, for attachment to a pickup truck, the covering apparatus comprising:
(A) a cover, comprising:
   (a) an upper surface defining a hitch opening sized to allow passage of a gooseneck trailer hitch; and
   (b) a trough, formed by the upper surface, defining a channel extending from the hitch opening to a tailgate;
(B) rail support means for adjusting the width of the covering apparatus, comprising:

(a) a rail cap; and (b) a flange, extending from the rail cap, defining fastening holes for attachment to the cover;

(C) a boot, carried by the cover adjacent to the hitch opening, the boot being adapted for attachment to the gooseneck trailer hitch; and (D) the tailgate having an upper edge defining a notch sized to mate with the trough of the cover, whereby the gooseneck trailer hitch could pass through the notch, through the channel defined by the trough, and into the hitch opening defined in the upper surface of the cover.

2. The covering apparatus of claim 1, wherein the trough formed by the upper surface further comprises:

(A) left and right sloping sidewalls;

(B) a removable trough floor; and (C) fastening means, carried by the sloping sidewalls and the removable trough floor, for fastening the removable trough floor to the left and right sloping sidewalls.

3. A covering apparatus, for attachment to a pickup truck, the covering apparatus comprising:

(A) a cover, comprising:

(a) an upper surface defining a hitch opening sized to allow passage of a gooseneck trailer hitch;

(b) a trough, formed by the upper surface, defining a channel extending from the hitch opening to a tailgate;

(c) a front support cover bracket, carried by the cover;

(d) a front support truck bracket, carried by the truck and attachable to the front support cover bracket;

(e) a rear support cover bracket, carried by the cover; and (f) a rear support truck bracket, carried by the truck and attachable to the rear support cover bracket;

(B) a rail support, comprising:

(a) a rail cap; and (b) a flange, extending from the rail cap, defining fastening holes for attachment to the cover;

(C) a boot, carried by the cover adjacent to the hitch opening, the boot being adapted for attachment to the gooseneck trailer hitch; and (D) the tailgate having an upper edge defining a notch sized to mate with the trough of the cover, whereby the gooseneck trailer hitch could pass through the notch, through the channel defined by the trough, and into the hitch opening defined in the upper surface of the cover.

4. The covering apparatus of claim 3, wherein the trough formed by the upper surface further comprises:

(A) left and right sloping sidewalls;

(B) a removable trough floor; and (C) fastening means, carried by the sloping sidewalls and the removable trough floor, for fastening the removable trough floor to the left and right sloping sidewalls.

* * * * *